United States Patent
Atkins

(10) Patent No.: US 10,824,613 B2
(45) Date of Patent: Nov. 3, 2020

(54) PRECONFIGURING MEASURES AND DIMENSIONS IN A DATABASE ANALYTICS APPLICATION

(71) Applicant: SAP SE, Walldorf (DE)

(72) Inventor: Brendon Atkins, Brisbane (AU)

(73) Assignee: SAP SE, Walldorf (DE)

( * ) Notice: Subject to any disclaimer, the term of this patent is extended or adjusted under 35 U.S.C. 154(b) by 445 days.

(21) Appl. No.: 15/382,333

(22) Filed: Dec. 16, 2016

(65) Prior Publication Data

US 2018/0046657 A1 Feb. 15, 2018

Related U.S. Application Data

(60) Provisional application No. 62/374,708, filed on Aug. 12, 2016.

(51) Int. Cl.
| | |
|---|---|
| *G06F 16/23* | (2019.01) |
| *G06F 16/25* | (2019.01) |
| *G06F 16/22* | (2019.01) |
| *G06F 16/2455* | (2019.01) |
| *G06F 16/2453* | (2019.01) |

(52) U.S. Cl.
CPC ........ *G06F 16/235* (2019.01); *G06F 16/2237* (2019.01); *G06F 16/2264* (2019.01); *G06F 16/2282* (2019.01); *G06F 16/2358* (2019.01); *G06F 16/2386* (2019.01); *G06F 16/2455* (2019.01); *G06F 16/2456* (2019.01); *G06F 16/24537* (2019.01); *G06F 16/254* (2019.01)

(58) Field of Classification Search
CPC .................................................. G06F 16/235
See application file for complete search history.

(56) References Cited

U.S. PATENT DOCUMENTS

| | | | |
|---|---|---|---|
| 8,868,544 B2 * | 10/2014 | Witkowski | ............ G06F 16/283 |
| | | | 707/713 |
| 2003/0204499 A1 | 10/2003 | Shahabi et al. | |
| 2008/0059415 A1 | 3/2008 | Bakalash et al. | |
| 2009/0100086 A1 * | 4/2009 | Dumant | ................ G06T 11/206 |
| 2009/0299969 A1 | 12/2009 | Le | |
| 2011/0055149 A1 | 3/2011 | Pimpale et al. | |

(Continued)

OTHER PUBLICATIONS

Atkins et al, Pending U.S. Appl. No. 15/385,597, filed Dec. 20, 2016.

(Continued)

*Primary Examiner* — Syling Yen
(74) *Attorney, Agent, or Firm* — Fountainhead Law Group P.C.

(57) ABSTRACT

The embodiments described in this disclosure comprise improved systems, methods and computer readable media for preconfiguring measures and dimensions in a database analytics application. In one embodiment, the solution described herein can be configured to activate only a subset of the measures from a catalog of measures supported by the database analytics application based on the data the user currently has stored in their database systems. Certain embodiments may be configured to determine (1) when a measure is selectable (i.e., activated) by users based on relevant base information contained in the user data, and (2) when to automatically activate inputs to a measure that has been previously selected.

20 Claims, 9 Drawing Sheets

(56) References Cited

U.S. PATENT DOCUMENTS

| | | |
|---|---|---|
| 2011/0261049 A1 | 10/2011 | Cardno et al. |
| 2011/0295870 A1 | 12/2011 | Bolsius et al. |
| 2014/0122415 A1 | 5/2014 | Chen et al. |
| 2015/0006470 A1* | 1/2015 | Mohan ............... G06F 16/283 707/603 |
| 2015/0193719 A1* | 7/2015 | Than .................. G06Q 10/105 705/7.39 |
| 2015/0356137 A1 | 12/2015 | Andros |
| 2015/0363465 A1 | 12/2015 | Bordawekar et al. |
| 2016/0012111 A1 | 1/2016 | Pattabhiraman et al. |
| 2016/0179922 A1* | 6/2016 | Crupi .................. G06F 16/243 707/737 |
| 2016/0335303 A1 | 11/2016 | Madhalam et al. |
| 2016/0335318 A1 | 11/2016 | Gerweck et al. |
| 2016/0371288 A1* | 12/2016 | Le Biannic ....... G06F 16/24575 |
| 2017/0116312 A1 | 4/2017 | Reichman et al. |
| 2017/0116313 A1 | 4/2017 | Roytman |
| 2017/0139888 A1 | 5/2017 | Ramlet et al. |
| 2017/0212938 A1 | 7/2017 | Botros et al. |
| 2017/0308536 A1 | 10/2017 | Azzam et al. |
| 2018/0046643 A1 | 2/2018 | Brodt et al. |

OTHER PUBLICATIONS

Brendon Atkins, Pending U.S. Appl. No. 15/336,535, filed Oct. 27, 2016.
Myers et al, Pending U.S. Appl. No. 15/336,609, filed Oct. 27, 2016.
Ashley Farr, Pending U.S. Appl. No. 15/384,105, filed Dec. 19, 2016.

* cited by examiner

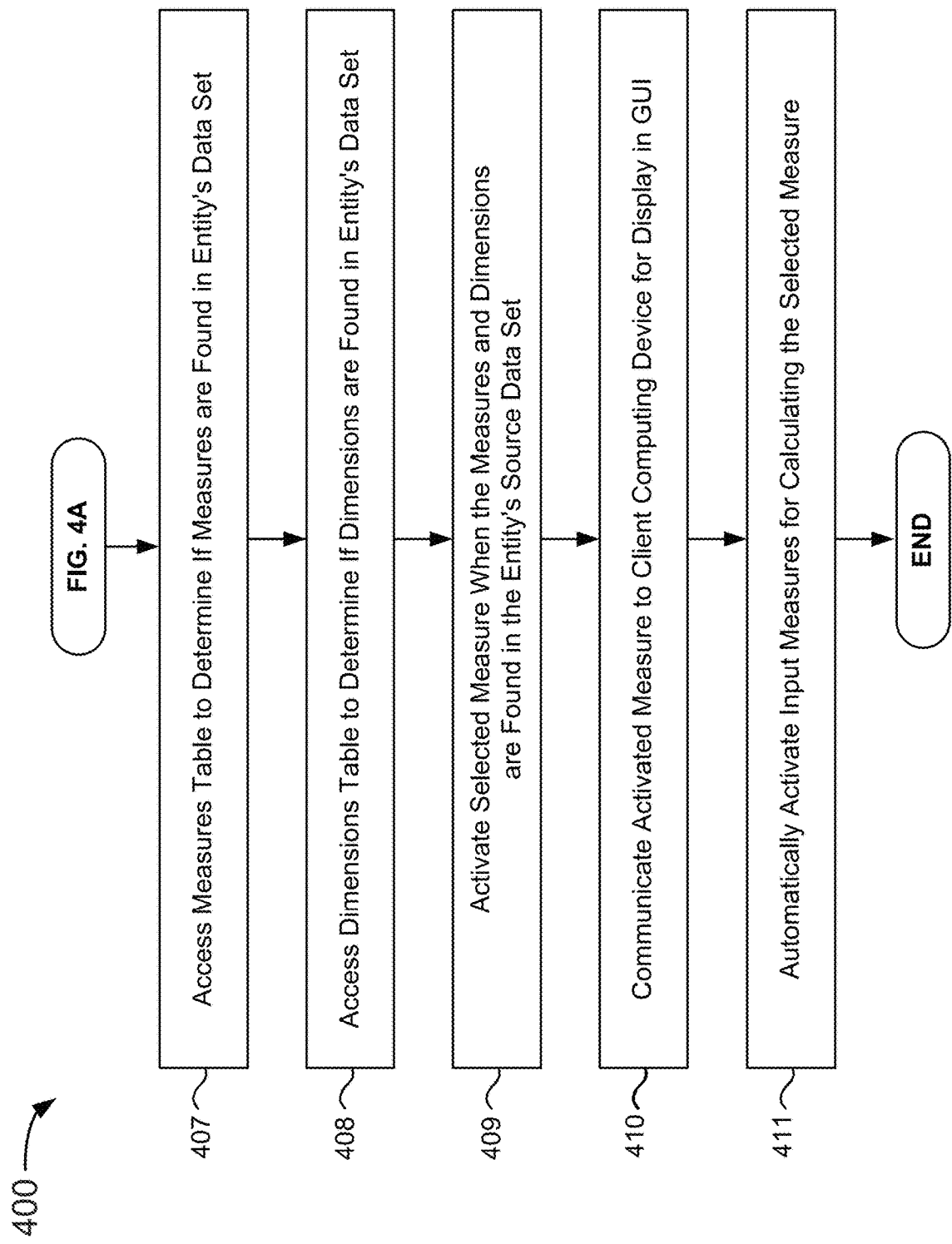

| Measures | Description |
|---|---|
| EopHc | End of Period Headcount |
| SopHc | Start of Period Headcount |
| Movein | Movements in |
| Male2Female | Male to Female Staffing Ratio |
| EopHcF | End of Period Headcount - Female |
| EopHcM | End of Period Headcount - Male |

| Measure def. | |
|---|---|
| Male2Female | (EopHcM)/(EopHcF) |

| Measure | Base | Dimension |
|---|---|---|
| EopHc | EopHc | |
| EopHcF | EopHc | Gender/Female |
| EopHcM | EopHc | Gender/Male |

PRECONFIGURING MEASURES AND DIMENSIONS IN A DATABASE ANALYTICS APPLICATION

CROSS REFERENCE TO RELATED APPLICATIONS

The present disclosure claims priority to U.S. Provisional App. No. 62/374,708, entitled "In-Memory Database System for Performing Online Analytics Processing", filed Aug. 12, 2016, the contents of which is incorporated herein by reference in its entirety.

BACKGROUND

In the new era of big data, companies and other organizations have access to vast amounts of structured and unstructured data as well as access to a variety of new data sources. As a result, many data analytics applications have been developed to provide users with insight into their data. One example genre of data analytics applications includes workforce analytics. Workforce analytics applications are used by businesses and other organizations to assist users in understanding their data, making appropriate decisions, and find answers to key questions to gain the insight needed to take actions. Workforce analytics applications are adapted for providing statistical models to worker-related data, allowing businesspersons or other organizational leaders to optimize their various enterprise processes.

Workforce analytics applications have become extremely sophisticated, and, as a result many analytics applications support a vast catalog of measures that can be selected for use in reporting. For example, some platforms contain over 12,000 entries for measures that are available for users to select and report on. All of the 12,000 measures are currently displayed to users in a graphical user interface, and a user has to parse and select measures from the list. This amount of measures can quickly become unwieldy, even in the most sophisticated user interfaces. And because users only need a subset of these vast catalogs of available measures for their particular enterprises, users often have to scroll through and search thousands of measures in their user interface to find the appropriate measures for selection. In addition, users may not know which measures are compatible with their subscriber data.

SUMMARY

The embodiments described in this disclosure comprise improved systems, methods and computer readable media for preconfiguring measures and dimensions in a database analytics application. In one embodiment, the solution described herein can be configured to activate only a subset of the measures from a catalog of measures supported by the database analytics application based on the data the user currently has stored in their database systems. Certain embodiments may be configured to determine (1) when a measure is selectable (i.e., activated) by users based on relevant base information contained in the user data, and (2) when to automatically activate inputs to a measure that has been previously selected.

The following detailed description and accompanying drawings provide a better understanding of the nature and advantages of the present disclosure.

BRIEF DESCRIPTION OF THE DRAWINGS

For a better understanding of the embodiments described in this disclosure, reference is made to the following detailed description, which is to be read in conjunction with the accompanying drawings.

FIGS. 4A-4B depict flow charts of an example embodiment of a process for preconfiguring dimensions and measures in a database analytics application in accordance with the techniques described in this disclosure.

DETAILED DESCRIPTION

Throughout the description, for the purposes of explanation, numerous specific details are set forth in order to provide a thorough understanding of the present disclosure. It will be apparent to one skilled in the art, however, that the techniques described in this disclosure may be practiced without some of these specific details. In other instances, well-known structures and devices may be shown in block diagram form to avoid obscuring the underlying principles of the techniques described in this disclosure.

The disclosed embodiments include improved methods, systems, and computer readable media adapted to preconfigure selectable measures and dimensions in a database analytics application. This solution may be operable to (1) determine whether to display a selectable measure in the user's analytics application graphical user interface ("GUI") based on its relevance to user data stored in one or more databases, and (2) determine which measures (e.g., base and derived measures) are to be automatically selected based on the measures that are determined to be selectable or have already been selected. This solution can be advantageous for, among other things, preventing the display of the entire set of measures in a vast catalog of measures supported by the database analytics application. For example, instead of users having to scroll through and search thousands of measures displayed in their analytics application user interface, the techniques described in this disclosure can determine in advance (or dynamically "on the fly") which measures and dimensions are relevant to the user's data, and to preconfigure and/or preselect these measures and dimensions to be selectable (also referred to herein as "activate") in the user interface. These measures and dimensions can then be used for analytics reporting on the user's data.

Conventional solutions display all the measures available in a catalog for selection in the user interface, which necessitates users having to scroll through and search numerous times to find the particular measures and dimensions for the user's data. In contrast to conventional solutions, the solution described in this disclosure can figure out which base measures or derived measures are needed as inputs for calculating the selectable measures using a formula or algorithm, and then preselect those measures.

Figure 1:
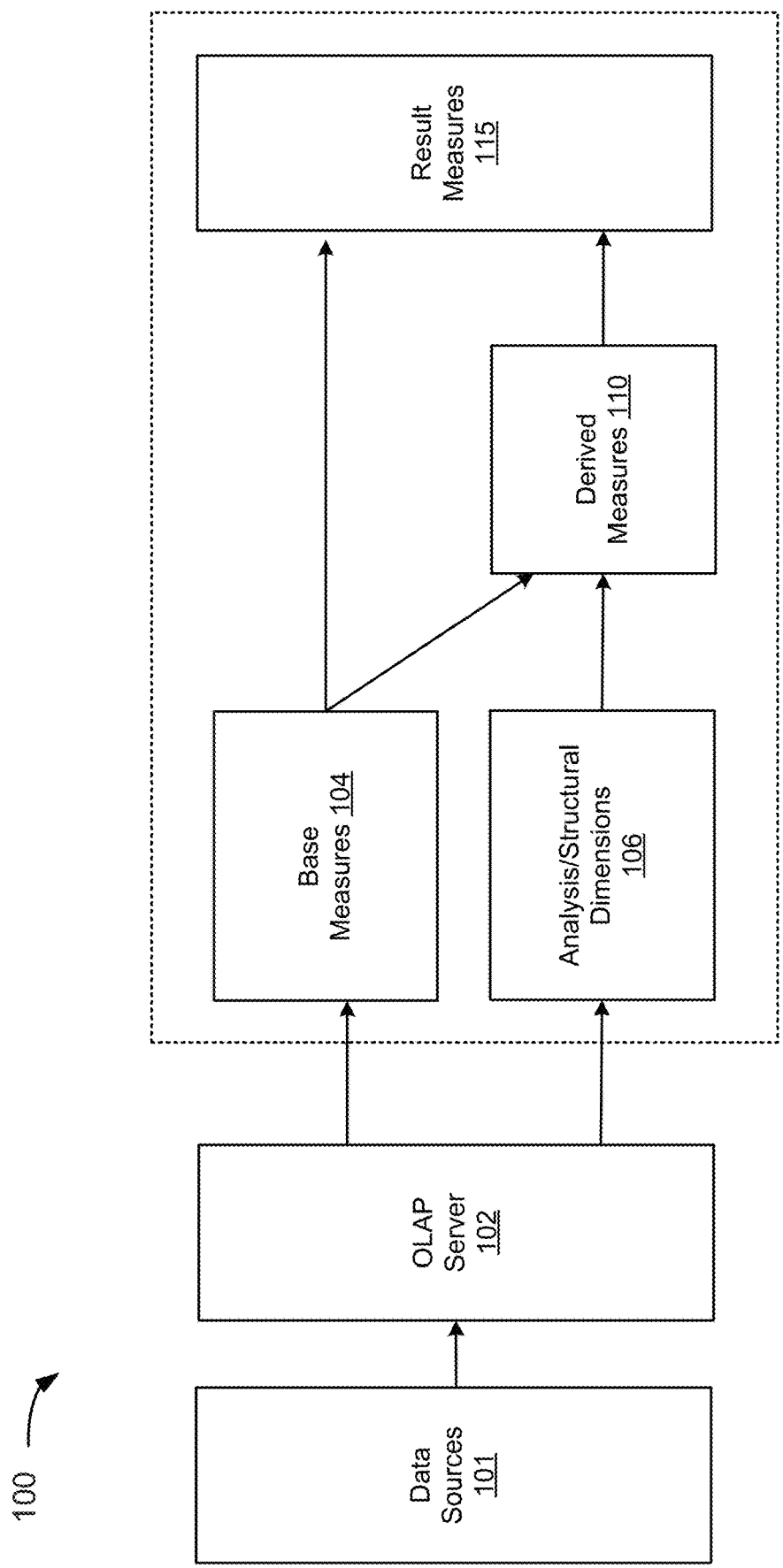
FIG. 1 depicts a conceptual block diagram of an example data flow diagram for processing data in accordance with at least certain of the embodiments described in this disclosure.

FIG. 1 depicts a conceptual block diagram 100 of an example data flow diagram for processing data in accordance with at least certain of the embodiments described in this disclosure. As used in this disclosure, a "measure" may refer to a numerical value typically representing a count within the user data, and a "dimension" may refer to categories for the measures. A dimension may comprise a column in a data set and a measure may refer to a value that can be aggregated for each dimension in a set of one or more resulting measures. For example, in a pie chart, the measures may be the area within the pie chart that would be divided up according to dimensions. In a bar chart, the dimensions may be placed along the x-axis and the measures may be placed along the y-axis.

Measures may include a count of employees currently employed within a subscriber, a count of how many employees changed position within a particular time period, or a count of any other attribute the subscriber requires aggregated values for. Measures may also be assigned an aggregation type such as sum, difference, average value, etc. Measures can include, for example, headcounts, full-time equivalents, movements and annual salary. A subscriber may be a company, or other entity that subscribes to using the service.

Measures can be broken down into base measures, derived measures, and result measures. Base measures can include a formula or algorithm, which exists inside a cube of the data set that determines how to produce a reportable value for a single individual based on that individual's data. Derived measures are typically measures defined in the catalog of measures supported by the database analytics application that include a base measure with a particular breakdown already defined (e.g., "End of Period Headcount—Male": End of period headcount pre-filtered to only include a count of male employees). And result measures may include a formula or algorithm that performs a calculation on pre-defined base measures and derived measures (e.g., "Male to Female Staffing Ratio": This measure divides the number of males ("End of Period Headcount☐Male") by the number of females ("End of Period Headcount☐Female")).

Dimensions may include attributes, for example, the "gender" dimension may include a "male" attribute and a "female" attribute. Dimensions break down measure values to determine individual attributes of the measure value (e.g., "gender": Each number can be broken down into how many males and how many females). Dimensions may include, for example, employee disability, equal employment opportunity (EEO) job category, employment level, employment status, employment type, ethnic background, gender, generation, grade, impact of loss, organizational unit, recruitment source, risk of loss, salary range, separation reason, veteran status, etc. In addition, dimensions can be broken down into structural dimensions and analysis dimensions.

Structural dimensions can include, for example, organizational unit, location and supervisor. Analysis dimensions can be, for example, age, gender, employment type, movement reasons, and tenures. Although these dimensions and measures are described, it will be understood that other dimensions and measures may be appreciated.

In the embodiment shown in FIG. 1, source data is provided by a number of different data sources 101 and received at an online analytical processing ("OLAP") server 102. In the illustrated embodiment, this may include base input measures data 104 and analysis and structural dimensions data 106. The source data 101 can be provided to the OLAP server 102 and used as a basis for base input measures 104 and analysis dimensions and/or structural dimensions 106. This information can be processed to obtain derived input measures 110 and/or result measures 115.

In one embodiment, the base measures 104 include the raw user data, such as head count, employee movement, etc. The base measure 104 includes a formula which exists inside a cube that determines how to produce a reportable value for a single person based on that person's data. The cube then aggregates each of these single reportable values into the aggregates. (e.g., End of Period Headcount: the number of employees currently in the company). A dimension 106 breaks down a measure value to determine the individual attributes of a measure value (e.g., Gender—each number can be broken down into how many Males and how many Females).

Once the dimensions 106 and base measures 104 have been configured, they can be used to generate a wider set of metrics to include derived measures, restricted measures, and result measures that are referred to as derived input measures 110 and/or result measures 115. A derived measure 110 is a measure includes a base measure with a particular breakdown already defined (e.g., End of Period (Eop) Headcount—Male: Eop Headcount pre-filtered to only include a count of male employees). A result measure 115 includes a formula that performs a calculation on the pre-defined base measures and derived measures (e.g., Male to Female Staffing Ratio: this measure divides the number of males (Eop Headcount-Male) by the number of females (Eop Headcount-Female)).

In addition, at least certain embodiments can be implemented with a multi-dimensional data structure referred to as a "cube data structure" that can be used to configure measures and dimensions for analytics processing. The cube data structure may also be referred to as a "cube data array" or "OLAP cube".

Figure 2:
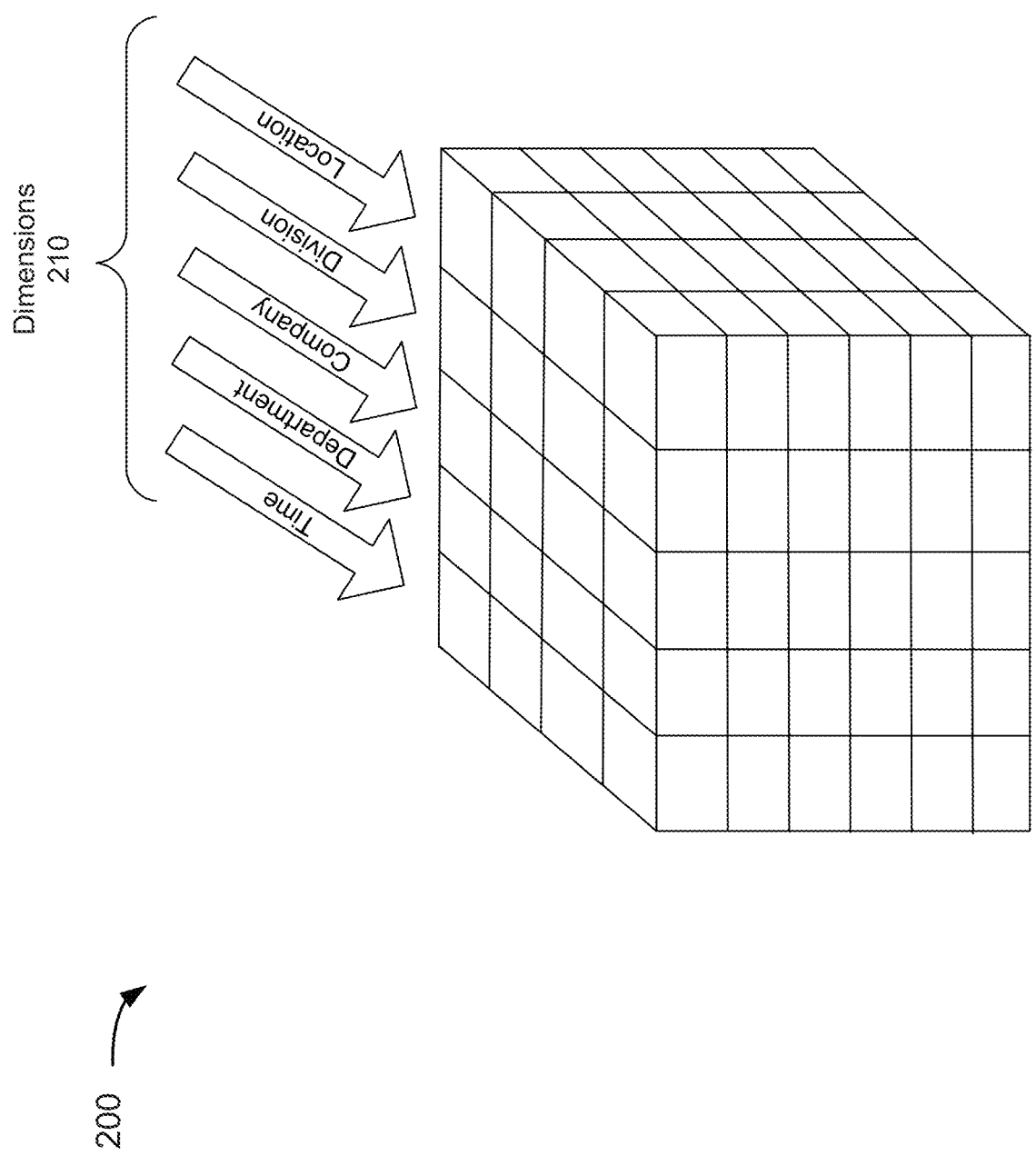
FIG. 2 depicts a conceptual block diagram of an example of a cube multi-dimensional data structure for use with at least certain of the embodiments described in this disclosure.

FIG. 2 depicts a conceptual block diagram of an example of a cube data structure for use with at least certain of the embodiments described in this disclosure. In the illustrated example, the base measures are built into the cube data structure 200 and categorized according to dimensions 210, which are shown as slices corresponding to time, department, company, division, and location. The data and data object hierarchies can be processed based on collating the dimensions 210 into the cube data array 200. As shown, the cube data structure 200 can aggregate reportable values into aggregates that can be validated and reported to a user.

In one example, an OLAP cube may enable easy aggregation of multiple values into a single number for analytics reporting via the data analytics user interface. And each number can be categorized by dimensions to determine the attributes that make up the number.

I. Illustrative Systems

Provided below is a description of example systems upon which the embodiments described in this disclosure may be implemented. Although certain elements may be depicted as separate components, in some instances one or more of the components may be combined into a single device or system. Likewise, although certain functionality may be described as being performed by a single element or component within the system, the functionality may in some instances be performed by multiple components or elements working together in a functionally coordinated manner.

In addition, hardwired circuitry may be used independently or in combination with software instructions to implement the techniques described in this disclosure. The described functionality may be performed by custom hardware components containing hardwired logic for performing operations, or by any combination of computer hardware and programmed computer components. The embodiments described in this disclosure are not limited to any specific combination of hardware circuitry or software. The embodiments can also be practiced in distributed computing environments where operations are performed by remote data processing devices or systems that are linked through one or more wired or wireless networks.

Figure 3A:
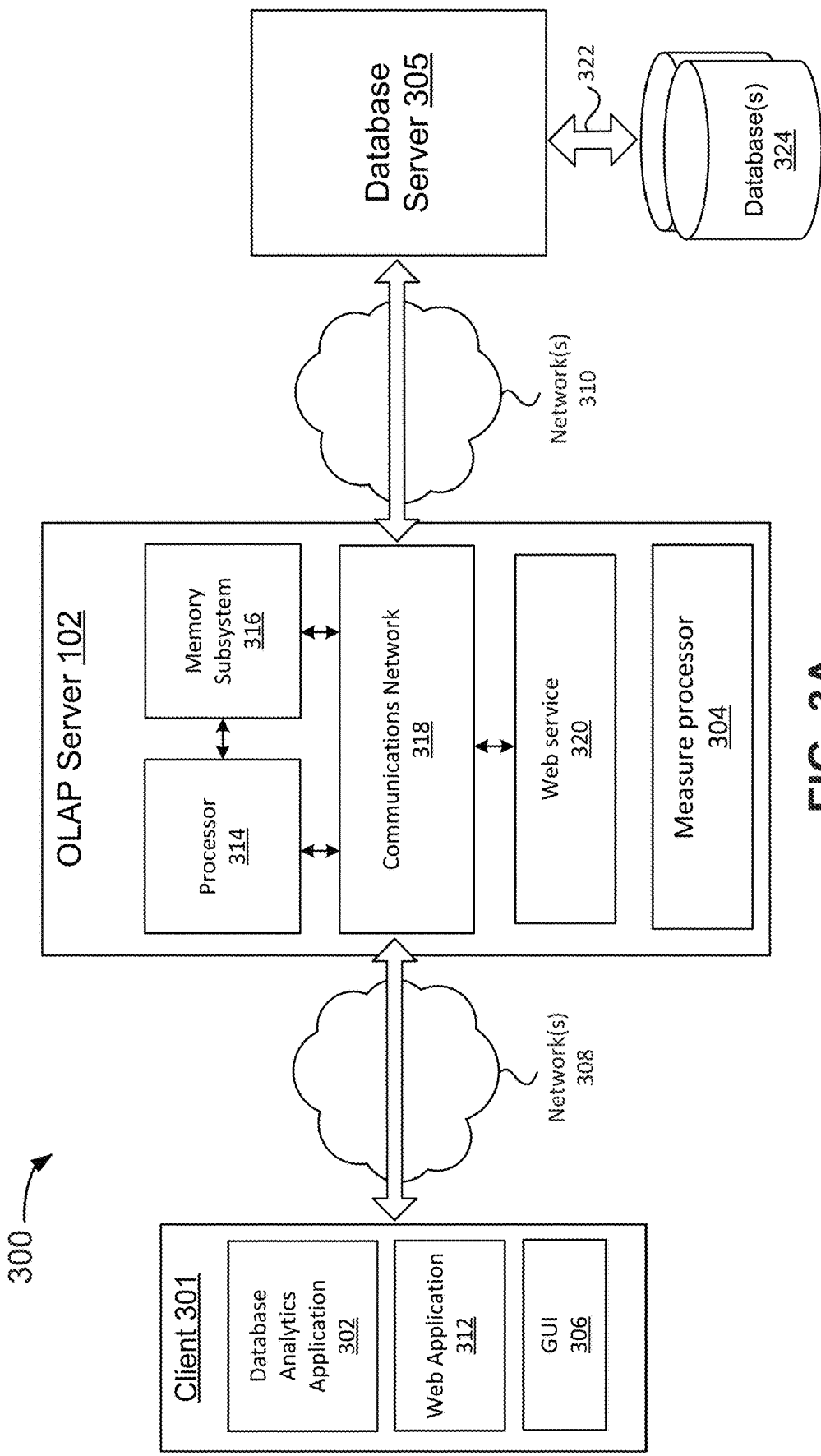
FIG. 3A depicts a conceptual overview block diagram of an example embodiment of a system for preconfiguring dimensions and measures in a database analytics application in accordance with the techniques described in this disclosure.

At least certain embodiments are operable for configuring database tables and data objects residing in database tables including configuring measures and dimensions in a user interface, and communicating this information over one or more networks to a database server in communication with one or more databases. FIG. 3A depicts a conceptual overview block diagram of an example embodiment of a system for preconfiguring measures and dimensions in a database analytics application in accordance with the techniques described in this disclosure.

The described database analytics application may be web-based or may reside locally on a user's computer system. The database analytics application 302 may be used to interact with and to configure and view reports of user data. In one embodiment, the system 300 may be configured to provide a user interface for the analytics application 302 via a web service 320 in, for example, in a cloud-based computer network architecture.

As shown in FIG. 3A, one or more clients 301, each having at least one graphical user interface (GUI) 306 executing a web application 312, are in communication with a web server, such as OLAP server 102, via one or more networks 308. The web server may provide a web service, such as an OLAP service, to the graphical user interface 306 of the clients 301 via, for example, a web service application 320 stored on OLAP server 102.

In FIG. 3A, OLAP server 102 is further in communication with a backend database server 305 over one or more networks 310. The database server 305 is further in communication with one or more databases 324 adapted to store data. In one embodiment, the database server 305 may be in remote communication with the databases 324 via one or more communication links or networks 322. Alternatively, database 324 may be a component of the database server 305 and configured to communicate with the database server 305 via a direct or indirect connection or network. In addition, the database(s) 324 may be implemented as any type of database system. One example embodiment includes a relational database system in which data is stored in structured database tables (or other data structures) comprised of rows and columns, and accessed through data storage rules (or schemas). Other examples of database systems include database systems where data can be stored in a semi-structured or unstructured format.

In one embodiment, the database server 305 can be configured to perform data accesses operations on data stored in the databases 324 via one or more communications links 322. The database server 305 may be implemented as an individual computer hardware server or as an array of computer hardware servers logically coupled together and working in a functionally coordinated manner Generally, a database server comprises a system configured to perform data access operations with respect to data stored in one or more repositories of data (e.g., database(s) 324). Depending on the type of database server 305, data operations may range from simple operations, such as storing and retrieving data, to more complex operations such as calculating statistics based on the data, or arranging, modifying, or formatting data.

The database server 305 may further include a database manager (not shown). The database manager may be configured as a general-purpose database management system ("DBMS") that communicates with the one or more databases for the purposes of storing and retrieving data to or from the databases. A DBMS may be configured as a computer software application that interacts with the database and other applications or users to capture and analyze data.

For example, a DBMS may be designed to allow for definition, creation, querying, update, and administration of databases. The database manager may comprise an integrated set of computer hardware and software programs that allow client systems to interact with the databases to provide access to data. In addition, the database manager may provide various functions that allow entry, storage, and retrieval of large quantities of information, and provide a mechanism to manage how the information is organized in the databases.

A database "query" may comprise a request for data or information from a database table or combination of database tables (or other data structures) in the database. Queries are the mechanism for retrieving information from a database and generally consist of questions presented to the database in a predefined format. This data may be generated as results returned by the SQL, or as pictorials, graphs or complex results, e.g., trend analysis from data-mining applications. Many database management systems use the SQL standard query format.

As will be appreciated by persons of skill in the art, network(s) may be implemented as a single wired or wireless network, or multiple separate networks in communication with one another. Network(s) may be implemented as any wired or wireless network(s). For example, the networks described herein can be implemented as a local area network ("LAN"), wide-area network ("WAN"), combination of LANs and WANs, the Internet, or any other type of communication network adapted for communicating electronic messages and information. Further, network(s) may be implemented as a physical array of hardware resources or as a virtual array, or any combination thereof. Network(s) may also be implemented in a cloud-based network configuration. For example, network(s) may be implemented as public or private cloud network, or combination thereof. No specific network or network architecture should be construed as limiting the embodiments and techniques described herein.

OLAP server 102 may be configured to communicate with a memory subsystem 316 to store and retrieve data for performing operations that are executed by processor 314 in accordance with the techniques described in this disclosure. For example, OLAP server 102 includes a measure processor 304 that can select measures for a user for display on user interface 306 instead of displaying all the measures in a catalog on user interface 306.

Figure 3B:
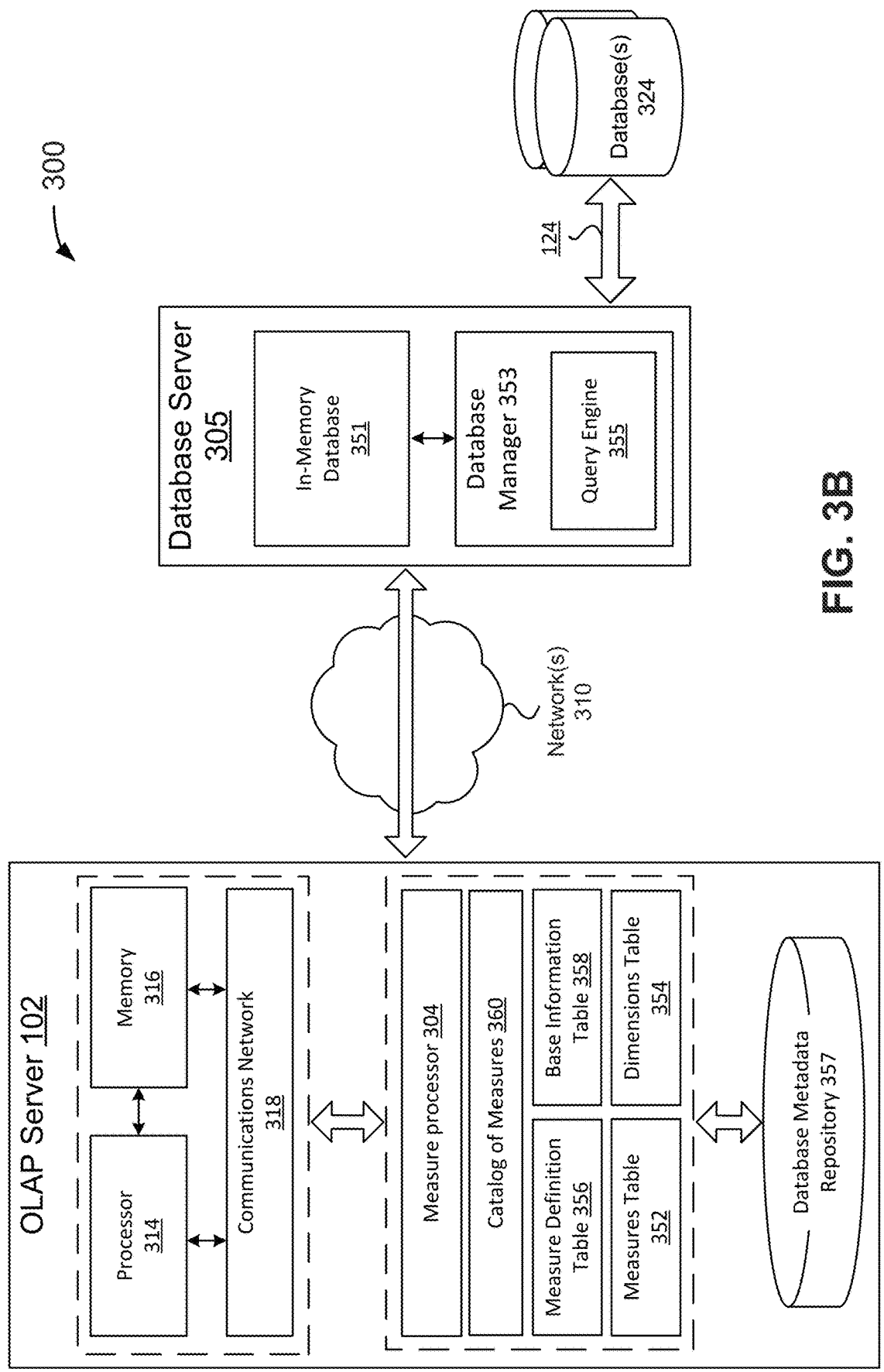
FIG. 3B depicts a conceptual block diagram of certain detailed information for an example embodiment of a system for preconfiguring measures and dimensions in a database analytics application in accordance with the techniques described in this disclosure.

FIG. 3B depicts a conceptual block diagram of further detailed information for an example embodiment of system 300 for preconfiguring measures and dimensions in a database analytics application 302 in accordance with the techniques described in this disclosure. At least certain embodiments are configured to be implemented using in-memory analytics. In-memory analytics is an approach to querying data when it resides in a computer's random access memory (RAM) (in-memory database 351) as opposed to querying data that is stored on separate physical disks. A database manager 353 includes a query engine 355 that can query in-memory database 351. This can result in vastly shortened query times, allowing business intelligence and analytics applications to support faster business decisions. In addition to providing fast query response times, in-memory analytics can reduce or eliminate the need for data indexing and storing pre-aggregated data. This can reduce IT costs and allow faster implementation of business intelligence and analytics applications. In one embodiment, the system described in this disclosure can be implemented on in-memory, column-oriented, relational database management system. The platform allows data analysts to query large volumes of data in real time, and its in-memory database infrastructure can free analysts from having to continuously load or write-back data to physical disks.

A database metadata repository 357 may store various tables that are used by measure processor 304 to determine active and inactive measures for a user. A catalog of measures table 360 contains the global catalog of every measure available and supported by analytics application 302. Base information table 358 contains information for base measures and derived measures that tell measure processor 304 which data should exist in the subscriber data for the measure to be able to be used on the subscriber data. Measure definition table 356 instructs analytics application 302 which base and derived measures are required to be queried out of the cube before in-memory computing is performed to calculate a result measure. Measure definition table 356 stores both the base and the derived measures. A derived measure is based on a base measure, for example, the base measure headcount filtered by male. As discussed above, the base measures 104 and result measures 115 include a formula that needs to be calculated. Analytics application 302 typically uses the formulas in measure definition table 356 to query the data, but measure processor 304 uses the formula table for the another purpose, that is, to determine which are the active and inactive measures for a user. Using the formulas, particular embodiments do not display every measure in catalog of measures table 360 to a user. Rather, measure processor 304 uses formulas in a measure definition table 356 to determine which measures are available for a user based on the user's data.

The measure definition table 356, base information table 358, and catalog of measures table 360 are global tables that exist across all subscribers. Each subscriber may also include subscriber -specific tables. For example, measures table 352 tells OLAP server 102 which measures are available in a subscriber's data. Dimensions table 354 tells OLAP server 102 which dimensions are available in the subscriber's data. These are the measures and dimensions that a subscriber has configured for use in their analytics application.

II. Illustrative Processes

Figure 4A:
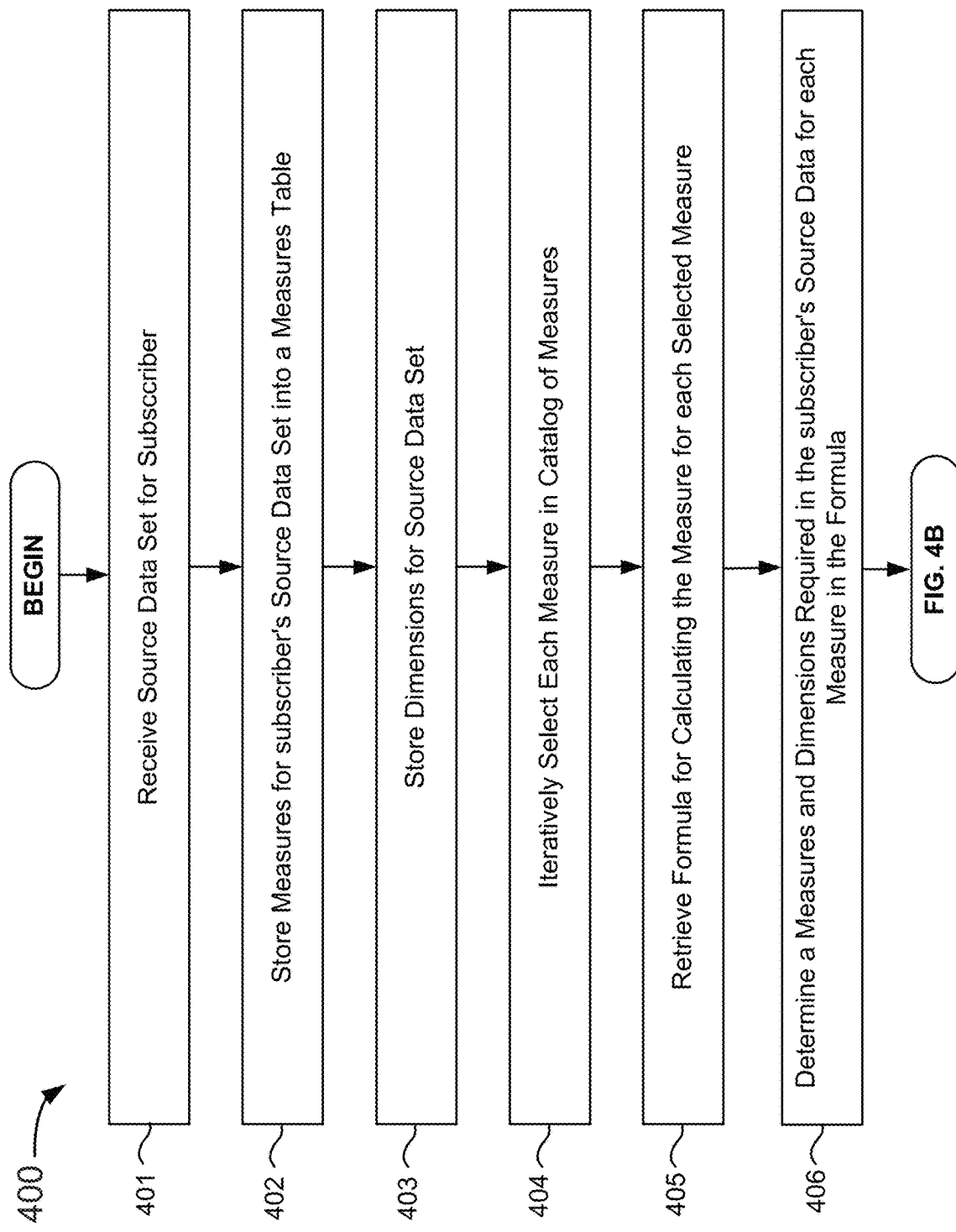

FIGS. 4A-4B depict flow charts for an example embodiment of a process for preconfiguring measures and dimensions in a database analytics application in accordance with the techniques described in this disclosure. FIGS. 4A-4B provide flow charts of operations to determine (1) whether to display a selectable measure based on its relevance to user data, and (2) which base and derived measures are to be selected automatically based on the selectable measures or measures that have been previously selected by a user.

It is noted that the processes described below are examples and are provided for illustrative purposes and not intended to limit the scope of the disclosure to any particular example embodiment. For instance, methods in accordance with some embodiments described in this disclosure may include or omit some or all of the operations described below, or may include steps in a different order than described in this disclosure. The particular methods described are not intended to be limited to any particular set of operations exclusive of all other potentially intermediate operations. In addition, the operations may be embodied in computer-executable code, which causes a general-purpose or special-purpose computer to perform certain functional operations. In other instances, these operations may be performed by specific hardware components or hardwired circuitry, or by any combination of programmed computer components and custom hardware circuitry.

FIG. 4A depicts a flow chart of an example embodiment of a process for preconfiguring measures and dimensions in a database analytics application in accordance with the techniques described in this disclosure. In the illustrated embodiment, process 400 begins at operation 401 by receiving a data set corresponding to a subscriber at a computer system such as a server computer. In one embodiment, the server computer may be implemented as an OLAP server 102 in accordance with the solution presented in this disclosure. The data set may be stored in one or more databases 324. In one embodiment, the data set may be assembled into an OLAP cube for processing.

Process 400 continues at operation 402 where measure processor 304 stores a plurality of measures available from the data set into a measures table 352 (or other data structure), and stores a plurality of dimensions available in the data set into a dimensions table 354 (or other data structure) at operation 403. These are measures available in a subscriber's data. In contrast, every measure available in a global catalogue for any subscriber can be stored into a catalog of measures 360, which may include an inventory of the various measures available for the analytics application 302 (e.g., 12,000 measures). The measures and dimensions in the subscriber's data may be a subset of measures included in the catalog of measures 360.

Measure processor 304 iteratively selects each measure (or a portion) stored in the catalog of measures 360 at operation 404. For each selected measure in the catalog of measures table 360, measure processor 304 retrieves the selected measure from a measure definition table 356 (or other data structure) at operation 405. In one embodiment, measure processor 304 accesses a base information table 358 (or other data structure) to determine what base measures and derived measures, and what dimensions are required to be found in the source data set to calculate the selected measure. The measure definition table 356 may include a formula for each of the base measures stored in the catalog of measures table 360. The retrieved formula may include a mathematical relationship among one or more base measures and derived measures in the catalog of measures table 352. The formula is used to determine how to produce a reportable value for a subscriber based on that subscriber's data. Each of these values can be aggregated for a cube data structure.

For each measure in the formula that is retrieved, measure processor 304 determines a set of base measures and derived measures and a set of dimensions and associated dimension attributes that are required to be found in the subscriber's data set to calculate the selected measure (operation 406).

Process 400 continues in FIG. 4B. Once measure processor 304 determines the base and derived measures and determines the dimensions, measure processor 304 accesses the measures table 352 to determine if the set of measures is found in the subscriber's data set (operation 407) and measure processor 304 accesses the dimensions table 354 to determine if the set of dimensions is found in the data set (operation 408). For example, a subscriber may have configured a measure or dimension in its data. The selected measure can then be activated (e.g., displayed to the user as selectable or preselected) for the subscriber's data in the database analytics user interface 302 when the set of measures and set of dimensions are found in the subscriber's source data set (operation 409). When the measure is not found in the subscriber's data, measure processor 304 does not activate the measure or dimension.

Once the iteration is finished, OLAP server 102 can then communicate the subset of activated measures to a client computing device 301 for display as an activated subset of measures in a user interface 306 of the client computing device 301 (operation 410). In one embodiment, the subset of activated measures may be selectable by users in the user interface 306 of the client computing device 301. In addition, OLAP server 102 can automatically activate any additional input measures needed for calculating a measure when that measure is selected(operation 411).

Figures 4C, 4D, 4E, 4F:
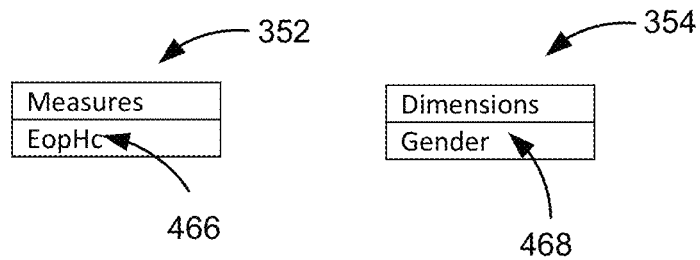
FIGS. 4C-4F shows a specific example for selecting a subset of measures to activate for a subscriber according to one embodiment.

FIGS. 4C-4F shows a specific example for selecting a subset of measures to activate for a subscriber according to one embodiment. Although this example is described, other measures may be used. FIG. 4C shows a portion of catalog of measures table 360 shows available measures in a column 450 and a description of each measure is shown in a column 452. For this example, measure processor 304 receives a selection of the "Male2Female" measure shown at 454.

FIG. 4D shows an example of a measure definition table 356 according to one embodiment. Measure processor 304 uses measure definition table 356 to determine that the Male2Female measure is a result measure due to the formula existing for the measure. Measure processor 304 then retrieves the formula associated with the Male2Female measure from table 356. The formula for the Male2Female measure is (EopHcM)/(EopHcF). EopHcM are derived measures from a base measure of EopHc. That is, EopHc is the end of period headcount for a subscriber and EopHcM is the end of period headcount for males and EopHcF is the end of period headcount for females. The Male2Female measure is determined by dividing the end of period headcount for males by the end of period headcount for females.

FIG. 4E shows an example of a base information table 358 according to one embodiment. For each base measure and derived measure in the formula, measure processor 304 looks up the details for them in base information table 358 to determine what to look for in the subscriber's data. In base information table 358, a column 460 lists the base measure EopHc, and derived measures EopHcF and EopHcM. In a column 462, the base measure of EopHc is found for the base measures and derived measures. Also, in a column 464, the dimension of gender is found for the derived measures of EopHcF (e.g., gender/female) and EopHcM (gender/male).

Once measure processor 304 determines the base measures and the dimensions that need to be in the subscriber's data, measure processor 304 can check the subscriber's data in measures table 352 and dimensions table 354. FIG. 4F shows an example of measures table 352 and dimensions table 354 according to one embodiment. As shown at 466, measures table 352 includes the base measure of EopHc and at 468, dimensions table 354 includes the dimension of gender. This indicates to measure processor 304 that the subscriber's data includes EopHc as a measure and gender as a dimension. Thus, the Male2Female measure can be shown as an available measure on user interface 306. Further, given the formula that indicates EopHcF and EopHcM are derived measures from EopHc, measure processor 304 can generate logic to automatically select the derived measures EopHcF and EopHcM when the base measure EopHc is selected by a user using user interface 306 as well.

In most if not all cases, measure processor 304 activates only a subset of the measures stored in the catalog of measures table 360 in an analytics application 302 for the source data set. Then, measure processor 304 prevents the remaining measures from being displayed as activated or selectable in the user interface. In general, users only require on the order of 100 to 200 of the thousands of available measures for the analytics application user interface, up to a maximum of around 1000 for some users. Thus, there is no need to display an entire catalog of selectable measures to users in the user interface since it is a significant effort to scroll and search through all such measures supported by an analytics application.

OLAP server 102 can prevent the measures that are not activated from being displayed as activated measures in the user interface of the client computing device. In one embodiment, client 301 gray out the inactive measures or remove these inactive measures entirely from the user interface 306.

Figure 5:
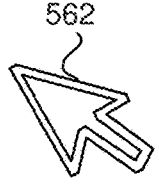
FIG. 5 depicts an example embodiment of a graphical user interface (GUI) for displaying preconfigured measures and dimensions in accordance with the techniques described in this disclosure.

FIG. 5 depicts an example embodiment of a graphical user interface (GUI) 306 for displaying preconfigured measures and dimensions in accordance with the techniques described in this disclosure. It will be understood that the measures and dimensions shown are examples and other measures and dimensions may be appreciated. As discussed, the solution presented in this disclosure makes life easier for users because they no longer have to scroll through and search thousands of measures in the user interface 306 to manually activate each measure. In addition, in accordance with the described solution users no longer have to manually activate each measure that relates to other measures because the measures can be activated automatically.

In the illustrated embodiment, the measures that are considered "selectable" based upon the subscriber's data are displayed in the user interface 306. The selectable measures 556 are displayed based on the base measures 550. In addition, at 558, client 301 receives a selection from a user selecting the Male to Female Staffing Ratio measure. As discussed above, this is a result measure, and has a base measure of EopHC. Then, at 562, client 301 can automatically select any derived measures for the base measure that are needed for calculating the result measure of Male to Female Staffing Ratio measure. In this embodiment, the derived measures at 560 of EopHcF and EopHcM are automatically selected in response to the selection of the Male to Female Staffing Ratio measure.

In addition, the corresponding dimensions 552 for the selectable measures are also displayed for the user data set in user interface 306. Users may select the selectable measures 556 or dimensions 552 using any mechanism such as a cursor or mouse pointer 560 in the depicted embodiment.

III. Illustrative Hardware Implementation

Embodiments of the present disclosure may be practiced using various computer systems including hand-held devices, microprocessor systems, programmable electronics, laptops, tablets and the like. The embodiments can also be practiced in distributed computing environments where tasks are performed by remote processing devices that are linked through one or more wire-based or wireless networks.

Figure 6:
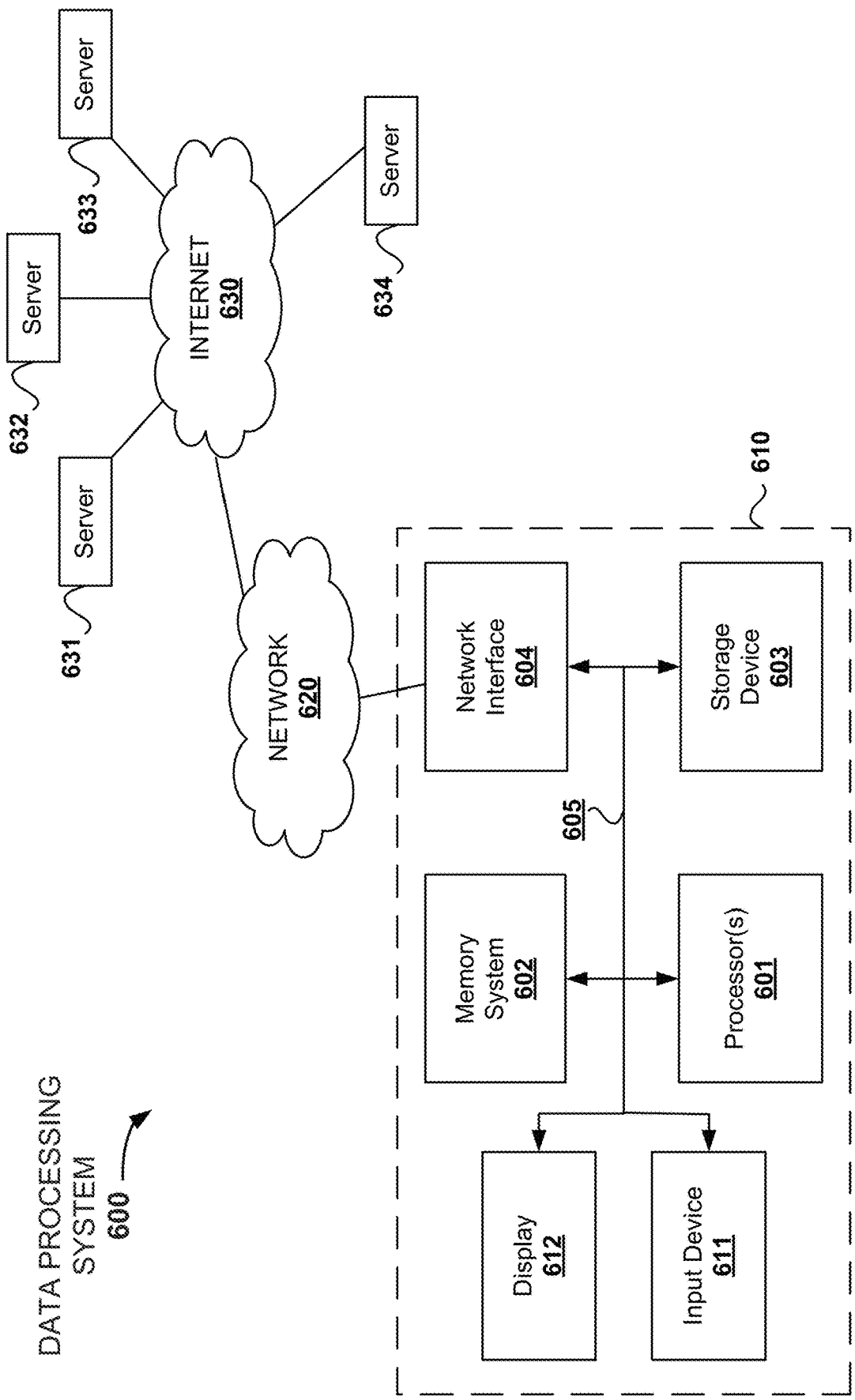
FIG. 6 depicts an example overview block diagram of a data processing system upon which the embodiments described in this disclosure may be implemented.

FIG. 6 depicts an example overview block diagram of a data processing system upon which the embodiments described in this disclosure may be implemented. The following hardware description is merely one example. It is to be understood that a variety of computers configurations may be used to implement the described techniques. While FIG. 6 illustrates various components of a data processing system 600, it is not intended to represent any particular architecture or manner of interconnecting components. It will also be appreciated that network computers and other data processing systems, which have fewer components or additional components, may be used. The data processing system 600 may, for example, comprise a personal computer (PC), workstation, laptop computer, tablet, smartphone or other hand-held wireless device, or any device having similar functionality.

In the illustrated embodiment, data processing system 600 includes a computer system 610. Computer system 610 includes an interconnect bus 605 (or other communication mechanism for communicating information) and one or more processor(s) 601 coupled with the interconnect bus 605 for processing information. Computer system 610 also includes a memory system 602 coupled with the one or more processors 601 via the interconnect bus 605. Memory system 602 is configured to store information and instructions to be executed by processor 601, including information and instructions for performing the techniques described above. This memory system may also be used for storing programs executed by processor(s) 601. Possible implementations of this memory system may be, but are not limited to, random access memory (RAM), read only memory (ROM), or combination thereof.

In the illustrated embodiment, a storage device 603 is also provided for storing information and instructions. Typically storage device 603 comprises nonvolatile memory. Common forms of storage devices include, for example, a hard drive, a magnetic disk, an optical disk, a CD-ROM, a DVD, a flash or other non-volatile memory, a USB memory card, or any other computer-readable medium from which a computer can read data and instructions. Storage device 603 may store source code, binary code, or software files for performing the techniques above. In addition, while FIG. 6 shows that storage device 603 as a local device connected with the components of the data processing system, it will be appreciated by skilled artisans that the described techniques may use a storage device remote from the system, such as a database or other network storage device coupled with the computer system 610 through a network interface such as network interface 604.

Network interface 604 may provide communications between computer system 610 and a network 620. The network interface 604 may be a wireless or wired connection, or any combination thereof. Computer system 610 is configured to send and receive information through the network interface 604 across one or more networks 620 such as a local area network (LAN), wide-area network (WAN), wireless or Bluetooth network, or the Internet 630, etc. Computer system 610 may access data and features on systems residing on one or multiple different hardware servers 631-634 across the network 620. Hardware servers 631-634 and associated server software may also reside in a cloud computing environment.

Storage device and memory system are both examples of non-transitory computer readable storage media. Embodiments in this disclosure can be embodied in computer-readable code stored on any computer-readable medium, which when executed by a computer or other data processing system, can be adapted to cause the system to perform operations according to the techniques described in this disclosure. Computer-readable media may include any mechanism that stores information in a form accessible by a data processing system such as a computer, network device, tablet, smartphone, or any device having similar functionality. Examples of computer-readable media include any type of non-transitory, tangible media capable of storing information thereon, including floppy disks, hard drive disks ("HDDs"), solid-state devices ("SSDs") or other flash memory, optical disks, digital video disks ("DVDs"), CD-ROMs, magnetic-optical disks, ROMs, RAMs, erasable programmable read only memory ("EPROMs"), electrically erasable programmable read only memory ("EEPROMs"), magnetic or optical cards, or any other type of media suitable for storing data and instructions in an electronic format. Computer-readable media can also be distributed over a network-coupled computer system stored and executed in a distributed fashion.

Further, computer system 610 may be coupled via interconnect bus 605 to a display 612 for displaying information to a computer user. An input device 611 such as a keyboard, touchscreen, and/or mouse is coupled to bus 605 for communicating information and command selections from the user to processor 601. The combination of these components allows the user to communicate with the system. In some systems, bus 605 represents multiple specialized interconnect buses.

With these embodiments in mind, it will be apparent from this description that aspects of the described techniques may be embodied, at least in part, in software, hardware, firmware, or any combination thereof. It should also be understood that embodiments can employ various computer-implemented functions involving data stored in a computer system. The techniques may be carried out in a computer system or other data processing system in response executing sequences of instructions stored in memory.

Throughout the foregoing description, for the purposes of explanation, numerous specific details were set forth in order to provide a thorough understanding of the disclosure. It will be apparent, however, to persons skilled in the art that these embodiments may be practiced without some of these specific details. The above examples and embodiments should not be deemed to be the only embodiments, and are presented to illustrate the flexibility and advantages of the present disclosure. Other arrangements, embodiments, implementations and equivalents will be evident to those skilled in the art and may be employed without departing from the spirit and scope of the disclosure as defined by the following claims.

What is claimed is:

1. A method comprising:
    storing, by a computing device, a catalog of measures data structure comprising an inventory of measures for a supported by a database analytics interface;
    storing, by the computing device, a plurality of measures available from a data set including a multi-dimensional array of data into a measures data structure, the plurality of measures available from the data set being a subset of measures of the catalog of measures data structure;

determining, by the computing device, whether the data set includes sets of measures that are required to calculate the measures of the catalog of measures data structure by:

retrieving, by the computing device, a formula for calculating a measure of the catalog of measures data structure from a measure definition data structure, the formula comprising a mathematical relationship among one or more measures in the catalog of measures data structure;

for each measure in the formula, determining, by the computing device, a set of measures that are required to be found in the data set to calculate the mathematical relationship; and accessing, by the computing device, the measures data structure to determine if the set of measures is found in the data set;

activating, by the computing device, the measures of the catalog of measures data structure that can be calculated from the data set such that they are displayed as selectable in the database analytics interface, wherein the measures of the catalog of measures data structure that cannot be calculated from the data set are not activated and are prevented from being displayed as selectable in the database analytics interface; and generating, by the computer device, logic to automatically display a first activated measure as being selected in the database analytics interface without requiring a user to manually select the first activated measure when a second activated measure is selected by the user based on a formula of the measure definition data structure involving the first activated measure and the second activated measure.

2. The method of claim 1 wherein a base information data structure is accessed to determine one or more base measures that are required to be found in the data set to calculate the selected measure.

3. The method of claim 1 wherein a dimension information data structure is accessed to determine one or more dimensions that are required to be found in the data set to calculate the selected measure.

4. The method of claim 1 wherein a first subset of the measures stored in the catalog of measures data structure is activated for the data set.

5. The method of claim 4 further comprising communicating the first subset of measures to a client computing device for display as selected measures in the database analytics interface of the client computing device, wherein a second subset of measures are displayed as unselected in the database analytics interface.

6. The method of claim 4 wherein:

the first subset of measures is selectable by users in the database analytics interface of the client computing device, and the second subset of measures is not selectable by the users in the database analytics interface of the client computing device.

7. The method of claim 1 further comprising upon receiving a selection of the measure in the database analytics interface, automatically displaying the set of measures required for calculating the selected measure as selected in the database analytics interface based on the logic.

8. The method of claim 1 wherein the measures that are not activated are prevented from being displayed as selected measures in the database analytics interface by being grayed out in the database analytics interface.

9. The method of claim 1 wherein the measures that are not activated are prevented from being displayed as selected measures in the database analytics interface by being removed from the database analytics interface.

10. The method of claim 1 wherein the set of measures include a base measure and a derived measure of the base measure.

11. The method of claim 10 wherein a set of dimensions are displayed as selected in the data analytics interface, the set of dimensions including a dimension for the derived measure.

12. The method of claim 11 wherein the base measure and the dimension for the derived measure are determined to be in the dataset.

13. A system comprising:

a database system comprising a database server in communication with one or more databases;

a computer system in communication with the database system over one or more networks, the computer system comprising at least one processor and a memory storing programmed computer code executable by the processor for performing operations comprising:

storing a catalog of measures data structure comprising an inventory of measures for a plurality of subscribers supported by a database analytics interface;

storing a plurality of measures available from a data set including a multi-dimensional array of data into a measures data structure, the plurality of measures available from the data set being a subset of measures of the catalog of measures data structure;

determining whether the data set includes sets of measures that are required to calculate the measures of the catalog of measures data structure by:

retrieving a formula for calculating a measure of the catalog of measures data structure from a measure definition data structure, the formula comprising a mathematical relationship among one or more measures in the catalog of measures data structure;

for each measure in the formula, determining a set of measures that are required to be found in the data set to calculate the mathematical relationship; and accessing the measures data structure to determine if the set of measures is found in the data set;

activating the measures of the catalog of measures data structure that can be calculated from the data set such that they are displayed as selectable in the database analytics interface, wherein the measures of the catalog of measures data structure that cannot be calculated from the data set are not activated and are prevented from being displayed as selectable in the database analytics interface; and generating logic to automatically display a first activated measure as being selected in the database analytics interface without requiring a user to manually select the first activated measure when a second activated measure is selected by the user based on a formula of the measure definition data structure involving the first activated measure and the second activated measure.

14. The system of claim 13 wherein a base information data structure is accessed to determine one or more base measures that are required to be found in the data set to calculate the selected measure.

15. The system of claim 13 wherein a dimension information data structure is accessed to determine one or more dimensions that are required to be found in the data set to calculate the selected measure.

16. The system of claim 13 wherein a first subset of the measures stored in the catalog of measures data structure is activated for the data set.

17. The system of claim 13 further comprising upon receiving a selection of the measure in the database analytics interface, automatically displaying the set of measures required for calculating the selected measure as selected in the database analytics interface based on the logic.

18. The system of claim 13 wherein the set of measures include a base measure and a derived measure of the base measure.

19. The system of claim 18 wherein a set of dimensions are displayed as selected in the data analytics interface, the set of dimensions including a dimension for the derived measure.

20. A non-transitory computer readable storage medium storing programmed computer code executable by a computer system to perform operations comprising:
    storing a catalog of measures data structure comprising an inventory of measures for a supported by a database analytics interface;
    storing a plurality of measures available from a data set including a multi-dimensional array of data into a measures data structure, the plurality of measures available from the data set being a subset of measures of the catalog of measures data structure;
    determining, by the computing device, whether the data set includes sets of measures that are required to calculate the measures of the catalog of measures data structure by:
        retrieving a formula for calculating a measure of the catalog of measures data structure from a measure definition data structure, the formula comprising a mathematical relationship among one or more measures in the catalog of measures data structure;
        for each measure in the formula, determining a set of measures that are required to be found in the data set to calculate the mathematical relationship; and
        accessing the measures data structure to determine if the set of measures is found in the data set;
    activating the measures of the catalog of measures data structure that can be calculated from the data set such that they are displayed as selectable in the database analytics interface, wherein the measures of the catalog of measures data structure that cannot be calculated from the data set are not activated and are prevented from being displayed as selectable in the database analytics interface; and
    generating logic to automatically display a first activated measure as being selected in the database analytics interface without requiring a user to manually select the first activated measure when a second activated measure is selected by the user based on a formula of the measure definition data structure involving the first activated measure and the second activated measure.

* * * * *